United States Patent [19]

Teraya et al.

[11] Patent Number: 5,436,297
[45] Date of Patent: Jul. 25, 1995

[54] MODIFIED POLYOLEFIN

[75] Inventors: Tatsuo Teraya; Shintaro Kikuchi; Kouichi Yokoyama; Yuji Fujita, all of Iruma, Japan

[73] Assignee: Tonen Corporation, Tokyo, Japan

[21] Appl. No.: 141,569

[22] Filed: Oct. 27, 1993

[30] Foreign Application Priority Data

Oct. 30, 1992 [JP]  Japan .................................. 4-315697
Oct. 30, 1992 [JP]  Japan .................................. 4-315698

[51] Int. Cl.$^6$ .................. C08F 255/00; C08F 285/00; C08F 287/00
[52] U.S. Cl. .................. 525/286; 525/279; 525/296; 525/309
[58] Field of Search ............... 525/282, 283, 286, 296, 525/309, 279

[56] References Cited

U.S. PATENT DOCUMENTS

| | | |
|---|---|---|
| 3,049,507 | 8/1962 | Stanton et al. |
| 3,699,186 | 10/1972 | Schrage . |
| 4,939,209 | 7/1990 | Kitagawa et al. |
| 4,994,520 | 2/1991 | Mori et al. |
| 5,036,141 | 7/1991 | Toyoshima et al. |
| 5,147,931 | 9/1992 | Sakuma et al. |
| 5,166,273 | 11/1992 | Kobayashi et al. |
| 5,298,557 | 3/1994 | Fujita et al. |

FOREIGN PATENT DOCUMENTS

| | | |
|---|---|---|
| 0480069 | 4/1992 | European Pat. Off. |
| 2190863 | 2/1974 | France . |
| 52156 | 5/1975 | Japan . |
| 105993 | 6/1977 | Japan . |
| 50040 | 4/1980 | Japan . |
| 67743 | 4/1983 | Japan . |
| 130580 | 7/1985 | Japan . |
| 236214 | 9/1989 | Japan . |
| 23814 | 1/1992 | Japan . |
| 4356530 | 12/1992 | Japan . |
| 43764 | 2/1993 | Japan . |
| 862765 | 4/1993 | Japan . |
| 6080835 | 3/1994 | Japan . |
| 1376777 | 12/1974 | United Kingdom . |
| WO14717 | 10/1991 | WIPO . |

OTHER PUBLICATIONS

Database WPI, Derwent Publns. Ltd., Abstract of JP-A-3 290 417 (1991).
Database WPI, Derwent Publns. Ltd., Abstract of JP-A-63 090 523 (1988).
Database WPI, Derwent Publns. Ltd., Abstract of JP-A-60 248-778 (1985).

*Primary Examiner*—Vasu S. Jagannathan
*Attorney, Agent, or Firm*—Birch, Stewart, Kolasch & Birch

[57] ABSTRACT

A modified polyolefin comprising: (A) 100 parts by weight of a polyolefin; (B) 0.01 to 20 parts by weight of a monomer mixture consisting of: (b-1) 5 to 50% by mole of glycidyl acrylate, glycidyl methacrylate or an unsaturated glycidyl compound represented by general formula (I) below $$\left( CH_2=\underset{R}{\underset{|}{C}}-\underset{O}{\underset{\|}{C}}-NH-CH_2 \right)_n - Ar \quad (I)$$

wherein R is a hydrogen atom or an alkyl group having 1 to 6 carbon atoms; Ar is an aromatic hydrocarbon group having 6 to 20 carbon atoms and having at least one glycidyl group; and n is an integer of 1 to 4, and (b-2) 95 to 50% by mole of at least one monomer selected from the group consisting of acrylamide monomers, vinylpyrrolidones, acrylic acid esters and methacrylic acid esters, the monomer mixture being graft-copolymerized with the polyolefin. The modified polyolefin, which uses monomers having good compatibility with the reactive monomers as a modifier, have high reactivity and high reaction efficiency since homopolymerization of the reactive monomers is prevented and reaction sites are uniformly distributed in the polyolefin. When melt-kneaded with other polymers, the modified polyolefin thus has excellent compatibility therewith and are useful as a modifier for various engineering plastics.

8 Claims, 3 Drawing Sheets

MODIFIED POLYOLEFIN

BACKGROUND OF THE INVENTION

1. Field of the Invention

This invention relates to a modified polyolefin useful as a modifier for engineering plastics and the like. More particularly, this invention relates to a modified polyolefin useful as modifier for engineering plastics such as polyesters, polyamides, etc., and as an adhesion improver for improving adhesion of such engineering plastics with fillers to be compounded therein.

1. Description of Related Art

Polyolefins are used widely in various applications as films, fibers, molded articles, etc. since they are produced industrially at low cost and are superior in molding properties, insulating properties, resistance to chemicals, mechanical strength, etc.

Recently, studies have been made extensively to melt and mix two or more polymers having different properties to obtain resin compositions having the respective features of the polymers. There have been developed many resin compositions having compounded therein polyolefins in order to make most of their characteristics.

However, resin compositions having compounded therein polyolefins themselves suffer poor compatibility because of the polyolefins being non-polar. More particularly, the polyolefins do not disperse uniformly when they are kneaded simply and conversely their rigidity, impact strength, elasticity, etc. decrease so that no resin compositions can be obtained that have desired physical properties.

In order to improve the compatibility of polyolefins, it has conventionally been known to modify polyolefins or blends of polyolefin and rubber or the like with maleic anhydride, unsaturated epoxy compounds or the like (Japanese Patent Application Laid-open Nos. 52156/1975, 105993/1977, 50040/1980, 67743/1983, 236214/1988, etc.).

However, such modified polyolefins or modified polyolefin elastomers have some disadvantages. That is, upon their preparation reaction, a decomposition reaction of the polyolefin main chain proceeds simultaneously so that there can be obtained only low molecular weight modified products. In addition, maleic anhydride and other substances used for modification are sublimating monomers which have irritating odors, and hence their working efficiencies upon melting reaction are not so high. Furthermore, the modified polyolefin and modified polyolefin elastomers thus obtained are not always sufficient as a compatible plasticizer since it is difficult to increase the graft ratio of maleic anhydride or the like therein to high enough a level.

Recently, modified polyolefins and modified polyolefin elastomers have been proposed in which glycidyl esters of acrylic acid or methacrylic acid are used as a modifier.

Also, there have been proposed resin compositions composed of polyamides, polyesters or the like blended with polyolefins or polyolefin elastomers modified with unsaturated glycidyl compounds represented by general formula (I) below

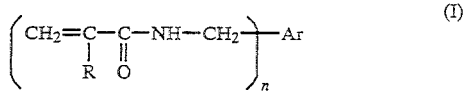

wherein R is a hydrogen atom or an alkyl group having 1 to 6 carbon atoms; Ar is an aromatic hydrocarbon group having 6 to 20 carbon atoms and having at least one glycidyl group; and n is an integer of 1 to 4 (WO91/14717, Japanese Patent Application Laid-open Nos. 23814/1992, 43764/1993, 86276/1993, etc.)

Here, glycidyl acrylate (GA), glycidyl methacrylate (GMA) and the compound of general formula (I) above used as a modifier have high reactivity and high reaction efficiency, and hence these modifiers give high graft ratio upon modification and the resin compositions obtained by melt-mixing the resulting modified polyolefin with the various engineering plastics described above have good dispersion compatibility and excellent physical properties.

However, these modifiers are highly homopolymerizable so that in the graft reaction upon the modification, they do not disperse in the polyolefin as monomer units but graft on the polyolefin as a polymer. As a result, reaction sites concentrate on certain points on the polymer, and the modified polyolefin as a whole has decreased reactivity and reaction efficiency.

Therefore, an object of this invention is to increase dispersability of the aforementioned modifier monomer in polyolefins and provide a modified polyolefin having improved reactivity and reaction efficiency.

As a result of intensive investigation, it has now been found that modification of polyolefins with the aforementioned reactive monomer and other monomer which is highly compatible therewith in combination enables good dispersion of the reactive monomer in the polyolefin, and gives rise to modified polyolefins which are superior in reactivity and reaction efficiency to the polyolefins modified with the aforementioned reactive monomer alone. This invention has been completed based on this discovery.

DISCLOSURE OF THE INVENTION

Figure 1:
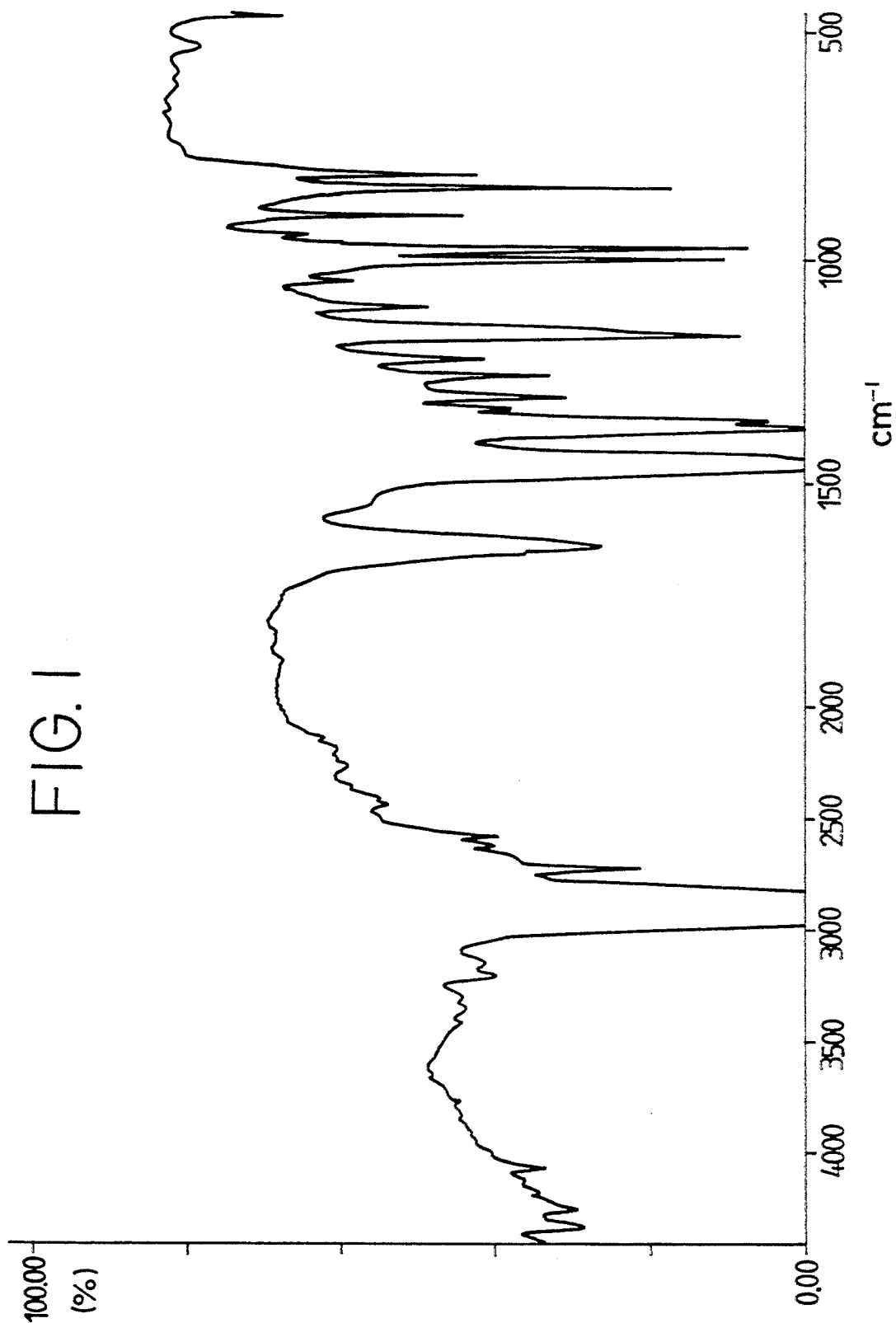
FIG. 1 is an infrared absorption spectrogram of a modified polypropylene obtained by modifying homopolypropylene with an unsaturated glycidyl compound (AXE) and diethylacrylamide (DEAA) in combination according to Example 19.

This invention provides a modified polyolefin comprising:
(A) 100 parts by weight of a polyolefin;
(B) 0.01 to 20 parts by weight of a monomer mixture consisting of:
(b-1) 5 to 50% by mole of glycidyl acrylate, glycidyl methacrylate or an unsaturated glycidyl compound represented by general formula (I) below

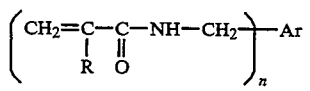

wherein R is a hydrogen atom or an alkyl group having 1 to 6 carbon atoms; Ar is an aromatic hydrocarbon group having 6 to 20 carbon atoms and having at least one glycidyl group; and n is an integer of 1 to 4, and (b-2) 95 to 50% by mole of at least one monomer selected from the group consisting of acrylamide monomers, vinylpyrrolidones, acrylic acid esters and methacrylic acid esters, the monomer mixture being graft-copolymerized with the polyolefin.

Hereinafter, the modified polyolefin of this invention will be described in detail.

The polyolefin (A), which is one of the starting materials of the modified polyolefin of this invention includes homopolymers of α-olefins (inclusive of ethylene); random-, block-, graft-copolymers of two or more of such α-olefins, and mixtures thereof; random-, block-, graft-copolymers of such α-olefins as a main component with one or more other unsaturated monomers; and olefin elastomers.

Here, examples of the α-olefins include ethylene, propylene, butene-1, hexene-1, 3-methylbutene-1, 4-methylpentene-1, heptene-1, octene-1, decene-1, etc.

Among the polyolefins, preferred are homopolymers of ethylene or propylene, ethylene/propylene copolymers, copolymers of ethylene or propylene with other α-olefins, and olefin elastomers.

As the polyethylene, there can be used low density polyethylene (LDPE), high density polyethylene (HDPE), linear low density polyethylene (LLDPE), etc.

Polypropylenes are not limited to homopolymers of propylene but include block- or random-copolymers of propylene with ethylene. The copolymers may be ethylene/propylene copolymers having an ethylene content of not higher than 20% by weight. Such polypropylenes have a melt flow rate (MFR, JISK7210, load: 2.16 kg, 230° C.) of usually about 0.1 to 200 g/10 minutes.

The polyethylenes or polypropylenes may contain up to about 40% by weight of the olefin elastomers described hereinbelow.

By the term "olefin elastomers", it is meant copolymer rubbers made from ethylene and one or more α-olefins other than ethylene such as propylene, butene-1, hexene-1, 4-methylpentene-1, etc. Typical examples of the copolymer rubbers made from ethylene and one or more α-olefins other than ethylene include ethylene/propylene copolymer rubber (EPR), ethylene/butene copolymer rubber (EBR), ethylene/propylene/diene terpolymer rubber (EPDM), etc. The diene used in ethylene/propylene/diene terpolymer rubber (EPDM) may be unconjugated dienes such as dicyclopentadiene, 1,4-hexadiene, cyclooctadiene, and methylenenorbornene, or conjugated dienes such as butadiene and isoprene.

EPR, EBR and EPDM may contain repeating units derived from other α-olefins such as 4-methylpentene-1 in amounts of not higher than 10% by mole.

In this invention, a mixture of (b-1) GA, GMA or unsaturated glycidyl compound and (b-2) the monomer having high compatibility with the reactive monomer is graft-copolymerized as the modifier (B) to the polyolefin (A).

Here, the unsaturated glycidyl compound is a compound having an acrylamide or methacrylamide group, and saturated glycidyl compounds represented by general formula (I) below are used preferably.

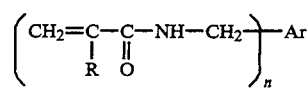

wherein R is a hydrogen atom or an alkyl group having 1 to 6 carbon atoms; Ar is an aromatic hydrocarbon group having 6 to 20 carbon atoms and having at least one glycidyl group; and n is an integer of 1 to 4.

Among the unsaturated glycidyl compounds of general formula (I) above, those represented by the following general formula are preferred.

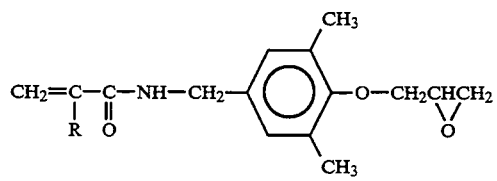

wherein R is a hydrogen atom or an alkyl group having 1 to 6 carbon atoms.

Such glycidyl compounds can be prepared by the method disclosed in, for example, Japanese Patent Application Laid-open No. 130580/1985. The polymerizable compounds may usually be used alone but two or more them may be used in combination.

In this invention, other monomers having high compatibility with the reactive monomers are used as a modifier simultaneously. That is, the use of monomers that dissolve with each other at relatively low temperatures at which polymerization of the highly polymerizable reactive monomers will not start yet prevents homopolymerization of the reactive monomers and allows graft-copolymerization to the polyolefin to occur.

As the monomer having high compatibility with the reactive monomers (b-1), there can be cited, for example, acrylamide monomers, N-vinyl-N-containing heterocyclic compounds, acrylic acid ester monomers, methacrylic acid ester monomers.

Examples of the acrylamide monomers include dialkylacrylamides, dialkylmethacrylamdides, monoalkylacrylamides, monoalkylmethacrylamides, etc. Examples of the N-vinyl-N-containing heterocyclic compounds include N-vinylpyrrolidones (1-vinyl-2-pyrrolidone), N-vinylphthalimide, etc. The acrylic acid monomers include, for example, alkyl acrylates such as 2-hydroxyethyl acrylate, the methacrylic acid monomer includes, for example, 2-hydroxyethyl methacrylate, etc. These monomers may be used alone or in combination with each other.

Among the monomers, preferred are 1-vinyl-2-pyrrolidone, dimethylacrylamide, diethylacrylamide, 2-hydroxyethyl methacrylate, etc.

In this invention, proportion of the component (b-1), i.e., the reactive monomer, to the other monomer (b-2) is 5 to 50% by mole, preferably 10 to 30% by mole, of (b-1) to 95 to 50% by mole, preferably 90 to 70% by mole, of (b-2).

In this invention, if the component (b-1) is less than 5% by mole (the component (b-2) is more than 95% by mole), reactivity becomes poor, while if the component (b-1) exceeds 50% by mole (the component (b-2) becomes less than 50% by mole), the component (b-1) homopolymerizes to decrease the reaction efficiency.

The modifier mixture (B) consisting of the components (b-1) and (b-2) is graft-copolymerized to the polyolefin (A).

Proportion of the component (B), i.e., the modifier mixture, to the component (A) is 0.01 to 10 parts by weight, preferably 0.1 to 5 parts by weight, of the component (B) to 100 parts by weight of the component (A). If the component (B) is less than 0.01 part by weight, the effects of the modifier monomers are difficult to exhibit while the use of the component (B) above 10 parts by weight decreases the graft efficiency considerably.

The modified polyolefins of this invention can be obtained by conventional graft polymerization such as a solution method or a melt kneading method, Hereinafter, concrete examples of the modification method will be described.

In the melt kneading method, the polyolefin (A), the modifier monomer (B) consisting of the components (b-1) and (b-2) mixed in advance, and optionally a catalyst are charged in an extruder, double-screw kneader or the like, and kneaded for 0.1 to 20 minutes while heating at 150 to 250° C. for melting to obtain a modified polyolefin.

On the other hand, in the solution method, the aforementioned starting materials are dissolved in an organic solvent such as xylene and a catalyst is added to the solution, which is allowed to react in the presence of a catalyst at 50° to 200° C. for 0.1 to 100 hours with stirring. In the solution method, it is not always necessary to mix the components (b-1) and (b-2) in advance. After completion of the reaction, the resulting modified polymer can be collected by a conventional method, e.g., by pouring the polymer solution in a non-solvent.

The modified polyolefin resin thus obtained has a graft ratio of about 0.01 to 10% by weight.

In either method, the catalyst used may be ordinary radical polymerization catalysts such as peroxides, for example, benzoyl peroxide, lauroyl peroxide, di-t-butyl peroxide, acetyl peroxide, t-butyl perbenzoate, dicumyl peroxide, perbenzoic acid, peracetic acid, t-butyl perpivalate, 2,5-dimethyl-2,5-di-t-butylperoxyhexine, etc. and azo compounds, for example, azobisisobutyronitrile, etc.

Amount of the catalyst to be added is about 0.1 to 50 parts by weight per 100 parts by weight of the total monomers used for modification. It is possible to add a phenol based antioxidant upon the graft reaction.

The modified polyolefins of this invention are excellent in reactivity and reaction efficiency since the reactive monomer disperses well in the polyolefin before it is grafted thereto.

It is presumed that the polyolefins of this invention have uniformly distributed modified sites (reaction sites) which could influence the compatibility with other polymers when blended with other polymers to prepare resin compositions, and this means that when the polyolefins of this invention are used in the formation of polymer alloys with other polymers, the compatibilities increase due to uniform distribution of reaction sites, so that the resulting resin compositions have physical properties which are combinations of the excellent features of component polymers.

EXAMPLES

Hereinafter, the invention will be described in more detail by examples and comparative examples. However, this invention should not be construed as being limited thereto.

In the examples and comparative examples below, the following starting components and catalysts were used.

Polyolefins (1) Homopolypropylene (homo-PP):
Y201, MFR (230° C., load: 2.16 kg) 1.5 g/10 minutes, prepared by Tonen Chemical Co., Ltd.
(2) High density polyethylene (HDPE):
J6170, MI(190° C., load: 1.05 kg) 7.5 kg/10 minutes, prepared by Tonen Chemical Co., Ltd.
(3) Ethylene/propylene rubber (EPR):
EPO2P, MFR (230° C., load: 2.16 gk) 3.2 g/10 minutes, prepred by Japan Synthetic Rubber Co., Ltd.

Radical Polymerization catalyst

POX: Perhexine 25B (prepared by Nippon Oil and Fats Co., Ltd.)

Monomer (b-1)

(1) Glycidyl methacrylate (GMA)
(2) Unsaturated glycidyl compound (AXE) represented by the following formula: (prepared by Kanegafuchi Kagaku Kogyo Co., Ltd. )

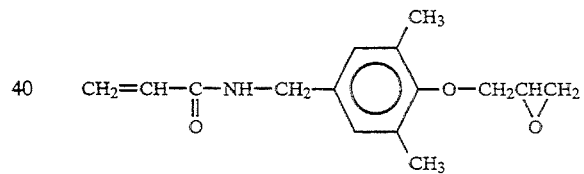

Monomer (b-2)

(1) Dimethylacrylamide (DMAA)
(2) Diethylacrylamide (DEAA)
(3) 1-Vinyl-2-pyrrolidone (2-VP)

Examples 1 to 18 and Comparative Examples 1 to 15

A mixture of the monomer (b-1) (GMA, AXE) and the monomer (b-2) (DMAA, DEAA, 2-VP) prepared in advance, the polyolefin (homo-PP, HDPE, EPR), and the catalyst (POX) were melt-kneaded in proportions shown in Table 1 in a single-screw extruder (30 mmφ, L/D ratio: 23) at a screw rotation speed of 50 rpm and at a temperature of 200° C., and pelletized.

The modified polyolefins thus obtained were measured for their melt flow rate (MFR), and evaluated of compatibilities with polyester and polyamide. The results are shown in Table 1.

TABLE 1

| Components* | Example | | | | | | | | |
|---|---|---|---|---|---|---|---|---|---|
| | 1 | 2 | 3 | 4 | 5 | 6 | 7 | 8 | 9 |

TABLE 1-continued

| | | | | | | | | | | |
|---|---|---|---|---|---|---|---|---|---|---|
| Polyolefin | Homo-PP | 100 | 100 | | | | | 100 | | |
| | HDPE | | | 100 | 100 | | | | 100 | 100 |
| | EPR | | | | | 100 | 100 | | | 100 |
| Monomer (b-1) | GMA | 0.2 | 0.2 | 0.2 | 0.2 | 0.2 | 0.2 | 0.2 | 0.2 | 0.2 |
| Monomer (b-2) | DMAA | 0.5 | | 0.5 | | 0.5 | | | | |
| | DEAA | | | | | | | 0.5 | 0.5 | 0.5 |
| | 2-VP | | 0.5 | | 0.5 | | 0.5 | | | |
| Catalyst | POX | 0.05 | 0.05 | 0.03 | 0.03 | 0.03 | 0.03 | 0.05 | 0.03 | 0.03 |
| Properties | | | | | | | | | | |
| Melt Flow Rate (230° C., 2.16 Kg, g/10 min.) | | 15 | 18 | 4.4 | 4.2 | 1.8 | 2.1 | 14 | 4.5 | 2.2 |
| Particle diameter of particles dispersed in polyester (μm) | | 0.4 | 0.4 | 0.4 | 0.5 | 0.5 | 0.4 | 0.4 | 0.4 | 0.4 |
| Particle diameter of particles dispersed in polyamide (μm) | | 0.7 | 0.7 | 0.8 | 0.6 | 0.5 | 0.6 | 0.6 | 0.5 | 0.6 |

| | | Example | | | | | | | | |
|---|---|---|---|---|---|---|---|---|---|---|
| | | 10 | 11 | 12 | 13 | 14 | 15 | 16 | 17 | 18 |
| Components* | | | | | | | | | | |
| Polyolefin | Homo-PP | 100 | 100 | | | | | 100 | | |
| | HDPE | | | 100 | 100 | | | | 100 | |
| | EPR | | | | | 100 | 100 | | | 100 |
| Monomer (b-1) | AXE | 0.5 | 0.5 | 0.5 | 0.5 | 0.5 | 0.5 | 0.5 | 0.5 | 0.5 |
| Monomer (b-2) | DMA.A | 1.5 | | 1.5 | | 1.5 | | | | |
| | DEAA | | | | | | | 1.5 | 1.5 | 1.5 |
| | 2-VP | | 1.5 | | 1.5 | | 1.5 | | | |
| Catalyst | POX | 0.1 | 0.1 | 0.05 | 0.05 | 0.05 | 0.05 | 0.1 | 0.05 | 0.05 |
| Properties | | | | | | | | | | |
| Melt Flow Rate (230° C., 2.16 Kg, g/10 min.) | | 24 | 31 | 4.1 | 3.3 | 1.5 | 1.4 | 22 | 4.3 | 1.9 |
| Particle diameter of particles dispersed in polyester (μm) | | 0.5 | 0.4 | 0.5 | 0.6 | 0.4 | 0.5 | 0.4 | 0.5 | 0.5 |
| Particle diameter of particles dispersed in polyamide (μm) | | 0.7 | 0.6 | 0.6 | 0.7 | 0.5 | 0.5 | 0.6 | 0.6 | 0.5 |

| | | Comparative Example | | | | | | | | |
|---|---|---|---|---|---|---|---|---|---|---|
| | | 1 | 2 | 3 | 4 | 5 | 6 | 7 | 8 | 9 |
| Components* | | | | | | | | | | |
| Polyolefin | Homo-PP | 100 | 100 | 100 | | | | | | |
| | HDPE | | | | 100 | 100 | 100 | | | |
| | EPR | | | | | | | 100 | 100 | 100 |
| Monomer (b-1) | GMA | 0.2 | 1.0 | — | 0.2 | 1.0 | — | 0.2 | 1.0 | — |
| Monomer (b-2) | DMAA | | | | | | | | | |
| | DEAA | | | | | | | | | |
| | 2-VP | | | | | | | | | |
| Catalyst | POX | 0.05 | 0.05 | — | 0.03 | 0.03 | — | 0.03 | 0.03 | — |
| Properties | | | | | | | | | | |
| Melt Flow Rate (230° C., 2.16 Kg, g/10 min.) | | 28 | 33 | 1.5 | 5.1 | 4.7 | 11 | 2.6 | 2.4 | 3.2 |
| Particle diameter of particles dispersed in polyester (μm) | | 4.0 | 3.3 | 15 | 5.2 | 3.8 | 20 | 3.4 | 2.8 | 17 |
| Particle diameter of particles dispersed in polyamide (μm) | | 5.1 | 4.2 | 21 | 6.0 | 4.1 | 19 | 3.8 | 2.9 | 23 |

| | | Comparative Example | | | | | |
|---|---|---|---|---|---|---|---|
| | | 10 | 11 | 12 | 13 | 14 | 15 |
| Components* | | | | | | | |
| Polyolefin | Homo-PP | 100 | 100 | | | | |
| | HDPE | | | 100 | 100 | | |
| | EPR | | | | | 100 | 100 |
| Monomer (b-1) | AXE | 0.5 | 2.0 | 0.5 | 2.0 | 0.5 | 2.0 |
| Monomer (b-2) | DMAA | | | | | | |
| | DEAA | | | | | | |
| | 2-VP | | | | | | |
| Catalyst | POX | 0.1 | 0.1 | 0.05 | 0.05 | 0.05 | 0.05 |
| Properties | | | | | | | |
| Melt Flow Rate (230° C., 2.16 Kg, g/10 min.) | | 42 | 28 | 4.5 | 3.2 | 2.1 | 2.0 |
| Particle diameter of particles dispersed in polyester (μm) | | 2.5 | 1.0 | 3.3 | 1.5 | 2.1 | 1.4 |
| Particle diameter of particles dispersed in polyamide (μm) | | 3.4 | 2.5 | 3.5 | 2.2 | 3.7 | 2.0 |

*parts by weight

Evaluations of compatibilities were performed as follows.

(1) Compatibility with Polyester

After dry blending 85 parts by weight of polybutene terephthalate (TRB-H: prepared by Teijin Limited.)

with 15 parts by weight of the polyolefin resin obtained in each of example or comparative example, the resulting mixture was melt kneaded in a double-screw extruder (30 mm$\phi$, L/D ratio: 42) at a screw rotation speed of 300 rpm and at a temperature of 250° C., and pelletized.

The projected area mean particle diameter of dispersed particles of each resin composition obtained was measured using a scanning electron microscope (SEM).

(2) Compatibility with Polyamide

After dry blending 80 parts by weight of polyamide (Nylon-6) with 20 parts by weight of the polyolefin resin obtained in each of example or comparative example, the resulting mixture was melt kneaded in a double-screw extruder (30 mm$\phi$, L/D ratio: 42) at a screw rotation speed of 300 rpm and at a temperature of 250° C., and pelletized.

The projected area mean particle diameter of dispersed particles of each resin composition obtained was measured using a scanning electron microscope in the same manner as in (1) above.

As will be apparent from Table 1, the modified polyolefin of this invention consisting of a polyolefin; GMA or AXE; and DMAA, DEAA or 2-VP is dispersed uniformly as small particles in the polymer alloy formation with polyester and polyamide. In contrast, the modified polyolefins (Comparative Examples 1, 4, 7, 10, 12 and 14) in which GMA or AXE alone were radical graft-polymerized in amounts equal to that of GMA or AXE used in the examples, or the modified polyolefins (Comparative Examples 2, 5, 8, 11, 13 and 15) in which GMA or AXE alone were radical graft-polymerized in amounts more than that of the reactive monomers used in the examples, dispersed polyolefin particles in the products of melt-kneading with the polyester and polyamides, respectively, have a particle diameter larger than that of the dispersed polyolefin particles obtained in the products of the examples, which indicates that the modified polyolefins of this invention are superior in compatibility to the conventional modified products modified with GMA or AXE alone.

Example 19

A mixture of 1.5 parts by weight of AXE and 1.5 parts by weight of DEAA prepared in advance, 10 parts by weight of homo-PP and 0.1 part by weight of a catalyst (POX) were melt-kneaded in a single-screw extruder (30 mm$\phi$, L/D ratio: 23) at a screw rotation speed of 50 rpm and at a temperature of 200° C., and pelletized. FIG. 1 shows an infrared absorption spectrogram of the modified polyolefin thus obtained.

Comparative Example 16

Figure 2:
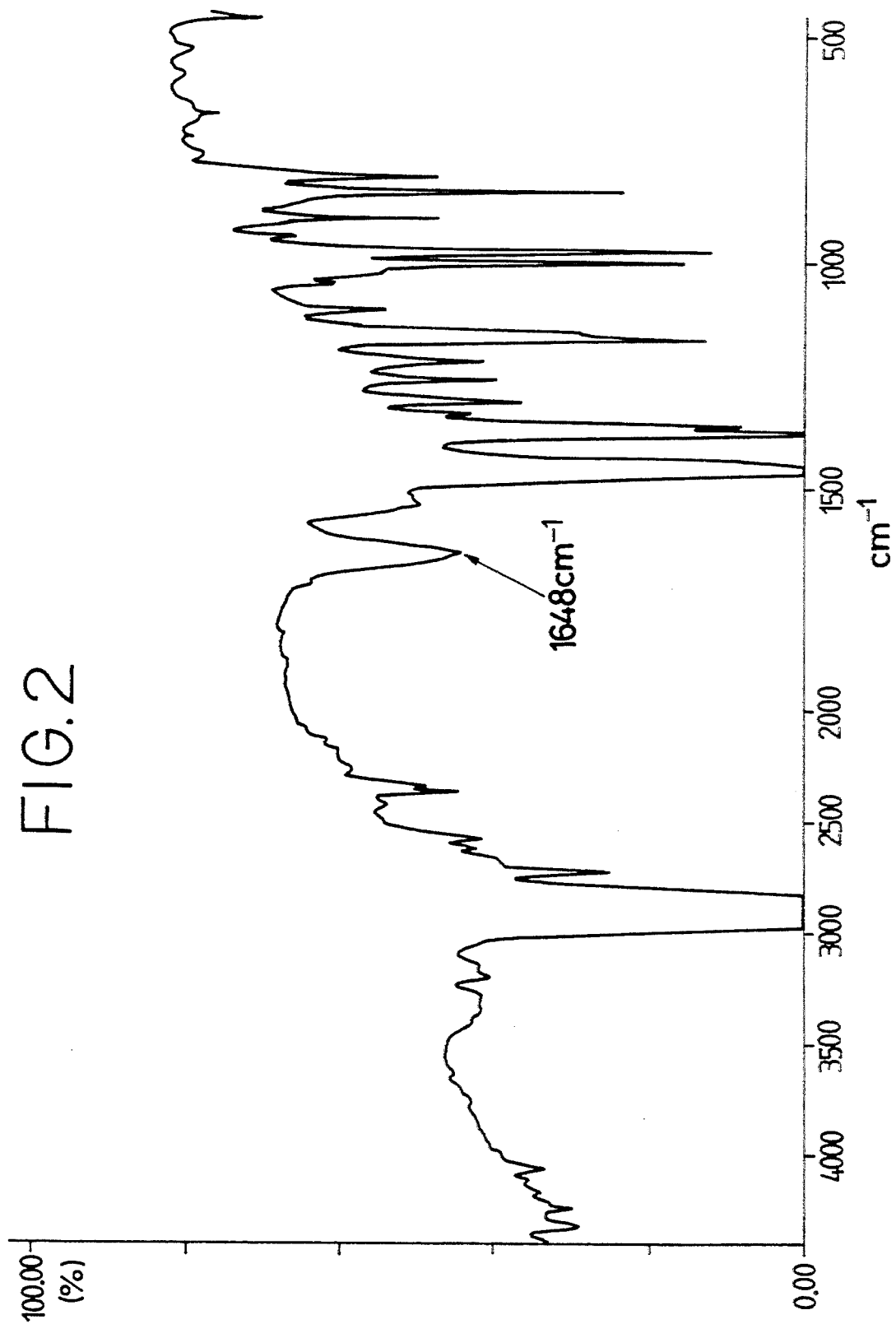
FIG. 2 is an infrared absorption spectrogram of a modified polypropylene obtained by modifying homopolypropylene with an unsaturated glycidyl compound (AXE) according to Comparative Example 16.

A mixture of 3 parts by weight of AXE, 100 parts by weight of homo-PP and 0.1 part by weight of a catalyst (POX) were melt-kneaded in a single-screw extruder (30 mm$\phi$, L/D ratio: 23) at a screw rotation speed of 50 rpm and at a temperature of 200° C., and pelletized. FIG. 2 shows an infrared absorption spectrogram of the modified polyolefin thus obtained.

Comparative Example 17

Figure 3:
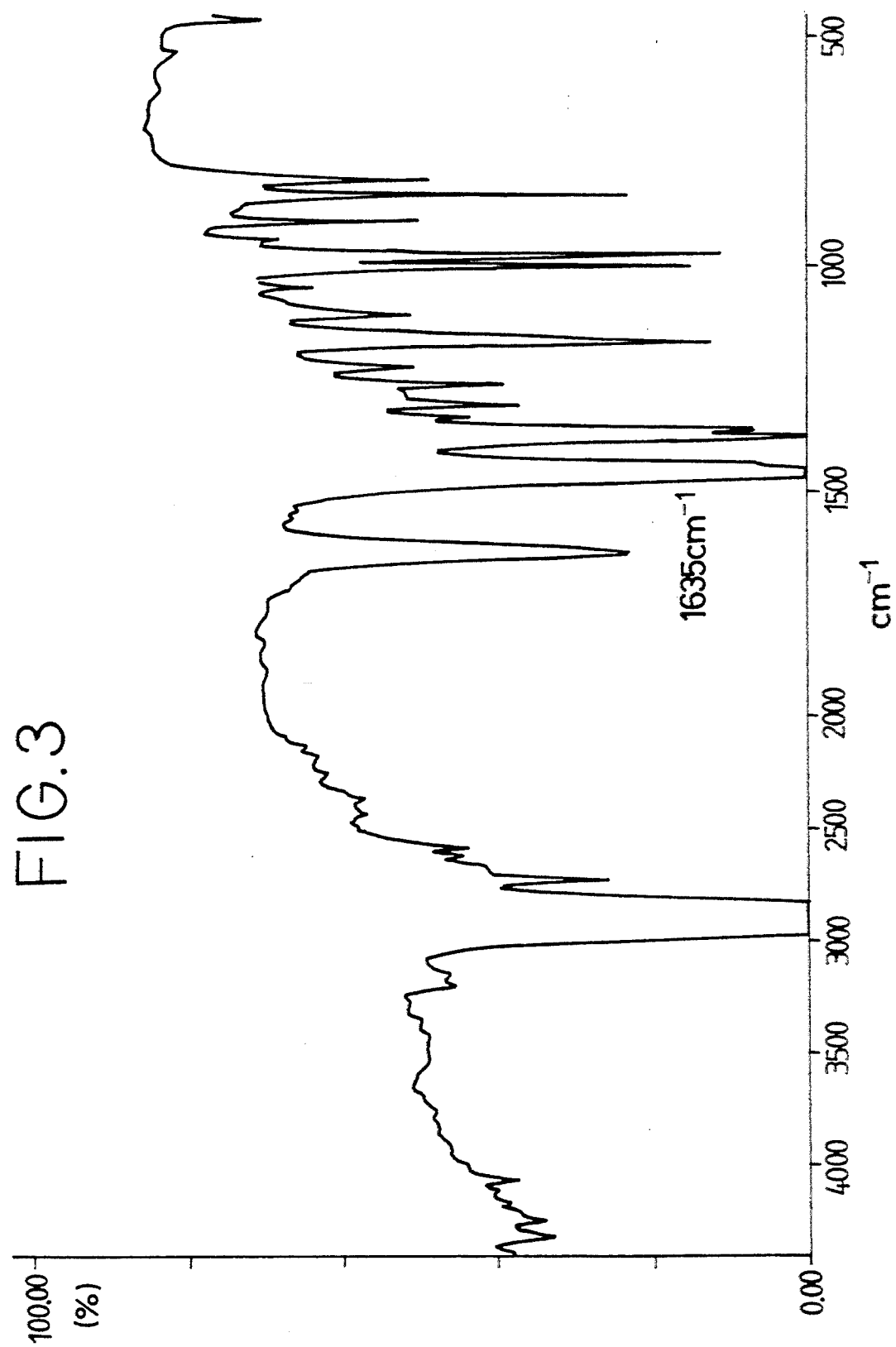
FIG. 3 is an infrared absorption spectrogram of a modified polypropylene obtained by modifying homopolypropylene with diethylacrylamide (DEAA) according to Comparative Example 17.

A mixture of 3 parts by weight of DEAA, 100 parts by weight of homo-PP and 0.1 part by weight of a catalyst (POX) were melt-kneaded in a single-screw extruder (30 mm$\phi$, L/D ratio: 23) at a screw rotation speed of 50 rpm and at a temperature of 200° C., and pelletized. FIG. 3 shows an infrared absorption spectrogram of the modified polyolefin thus obtained.

From FIGS. 1 to 3, it can be seen that in the modified polyolefins of this invention, the reactive monomer and DEAA are graft-polymerized to the polyolefin simultaneously.

That is, the modified polyolefin of Comparative Example 16 modified with AXE alone (FIG. 2) shows absorption due to vibration of carbonyl bond in the acrylamide at 1648 cm$^{-1}$ while the modified polyolefin of Comparative Example 17 modified with DEAA alone (FIG. 3) shows absorption due to vibration of carbonyl bond in the acrylamide at 1635 cm$^{-1}$. In contrast, the modified polyolefin of Example 19 modified with AXE and DEAA in combination (FIG. 1) shows a shoulder in absorption due to overlap of absorptions at 1648 cm$^{-1}$ and 1635 cm$^{-1}$.

ADVANTAGEOUS EFFECTS OF THE INVENTION

The modified polyolefins of this invention have high reactivity and high reaction efficiency, are highly compatible with various engineering plastics and thus are useful as a modifier for engineering plastics. Also, the modified polyolefins of this invention are expected to have good adhesion with various fillers such as glass fibers, carbon fibers, talc, calcium carbonate, various whiskers, etc. which are added to such engineering plastics, and are useful as an adhesion improver for various fillers.

What is claimed is:

1. A modified polyolefin comprising:
 (A) 100 parts by weight of a polyolefin;
 (B) 0.01 to 20 parts by weight of a monomer mixture consisting of:
  (b-1) 5 to 50% by mole of glycidyl acrylate, glycidyl methacrylate or an unsaturated glycidyl compound represented by general formula (I) below

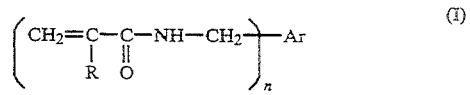

wherein R is a hydrogen atom or an alkyl group having 1 to 6 carbon atoms; Ar is an aromatic hydrocarbon group having 6 to 20 carbon atoms and having at least one glycidyl group; and n is an integer of 1 to 4, and
  (b-2) 95 to 50% by mole of at least one monomer selected from the group consisting of acrylamide monomers, and vinylpyrrolidones,
   said monomer mixture being graft-copolymerized with the polyolefin.

2. The modified polyolefin as claimed in claim 1, wherein said component (b-1) is glycidyl acrylate.

3. The modified polyolefin as claimed in claim 1, wherein said component (b-1) is glycidyl methacrylate.

4. The modified polyolefin as claimed in claim 1, wherein said component (b-1) is said compound represented by said general formula (I).

5. The modified polyolefin as claimed in claim 4, wherein said component (b-1) is a compound represented by the formula (II) below

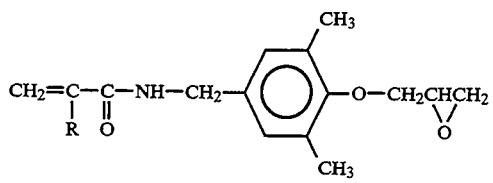
(II)

wherein R is a hydrogen atom or an alkyl group having 1 to 6 carbon atoms,

6. The modified polyolefin as claimed in claim 1, wherein said polyolefin (A) is at least one member selected from the group consisting of homopolymers of α-olefins, inclusive of ethylene; random-, block-, graft-copolymers of two or more of such α-olefins, and mixtures thereof; random-, block-, graft-copolymers of such α-olefins as a main component with one or more other unsaturated monomers; and olefin elastomers.

7. The modified polyolefin as claimed in claim 1, wherein said component (b-2) is an acrylamide monomer and wherein said acrylamide monomer is at least one member selected from the group consisting of dialkylacrylamides, dialkylmethacrylamdides, monoalkylacrylamides, and monoalkylmethacrylamides.

8. The modified polyolefin as claimed in claim 1, wherein said component (b-2) is an N-vinyl-N-containing heterocyclic compound and wherein said N-vinyl-N-containing heterocyclic compound is at least one member selected from the group consisting of N-vinylpyrrolidone, (1-vinyl-2-pyrrolidone), and N-vinylphthalimide.

* * * * *